March 27, 1962  J. H. JOHNSON  3,026,950
APPARATUS FOR BORING HOLES
Filed Feb. 28, 1958  5 Sheets-Sheet 1

FIG. 1

INVENTOR.
JOHN H. JOHNSON
BY
Braddock and Braddock
ATTORNEYS

March 27, 1962

J. H. JOHNSON 3,026,950

APPARATUS FOR BORING HOLES

Filed Feb. 28, 1958

INVENTOR.
JOHN H. JOHNSON
BY
Braddock and Braddock
ATTORNEYS

March 27, 1962 J. H. JOHNSON 3,026,950
APPARATUS FOR BORING HOLES
Filed Feb. 28, 1958 5 Sheets-Sheet 5

INVENTOR.
JOHN H. JOHNSON
BY
Braddock and Braddock
ATTORNEYS

United States Patent Office 3,026,950
Patented Mar. 27, 1962

3,026,950
APPARATUS FOR BORING HOLES
John H. Johnson, Bigelow, Minn.
Filed Feb. 28, 1958, Ser. No. 718,239
9 Claims. (Cl. 175—161)

The invention herein has relation to a hole boring apparatus which has been devised to be especially useful for the purpose of producing wells.

The object of this invention is to provide an apparatus for boring wells wherein will be incorporated various novel and improved features and characteristics of construction devised to render the present apparatus an improvement over and equipped to be operable in a more efficient manner than more or less similar apparatus heretofore known for accomplishing the same general purposes.

In the accompanying drawings forming a part of this specification.

A frame 10 of the apparatus is suitably and conveniently mounted on transporting wheels 11.

A prime mover 12, on a forward portion of the frame, is operatively connected, through the instrumentality of a manually operable clutch mechanism 13, with a driven shaft 14 extending transversely of said frame.

A differential 15, suitably and conveniently supported on the frame at the rear of and in spaced, longitudinally aligned relation to the prime mover, includes an input shaft 16 to be driven by said prime mover, through the instrumentality of a V-belt 17 riding a pulley 18 fixed on said input shaft and also riding a pulley 19 fixed on the driven shaft 14. The pulleys 18 and 19 are in longitudinal alinement.

A horizontal, longitudinally extending first axle 20 of the differential 15 is disposed forwardly thereof and a horizontal, longitudinally extending second axle 21 of said differential is disposed rearwardly thereof. The first and second axles 20 and 21 are in alinement. The differential has a manually operable brake 122 adjacent the first axle 20 which when operated clamps said first axle so that rotation of input shaft 16 will cause the second axle 21 to be rotated, and said differential also has a manually operable brake 123 adjacent the second axle 21 which when operated clamps said second axle so that rotation of said input shaft will cause the first axle to be rotated. Gear shift mechanism 24 includes a gear shift lever 25 manually manipulatable to alter the speed of operation, to reverse, or to disconnect the differential 15 from the input shaft 16. Desirably, there can be provision for three speeds forward and one speed in reverse.

A brake lever 22 is associated with the brake 122 to permit the clamping of the first axle 20, and a handle 23 is associated with the brake 123 to permit clamping of the second axle 21. The mechanism of a differential 15 includes an input shaft pinion 124 drivingly associated with a ring gear 125 which is freely rotatable on the axis of shaft 21, planetary gears 126, 126 mounted to rotate about the plane of their axes with said ring gear, first axle pinion 127 on said first axle 20 and operably associated with planetary gears 126, and second axle pinion 128 mounted on said second axle 21 and also operably associated with said planetary gears 126.

A cross shaft 26, suitably and conveniently mounted on the frame 10 at a location rearwardly of the differential 15, supports first and second hoisting drums, denoted 27 and 28, respectively. A brake 29 is for bringing the first hoisting drum 27 to rest, and a brake 30 is for bringing the second hoisting drum 28 to rest. Devices, indicated 31 and 32, respectively, are for independently and selectively securing the first and second hoisting drums 27 and 28 to and releasing said hoisting drums from said cross shaft.

Figure 7:
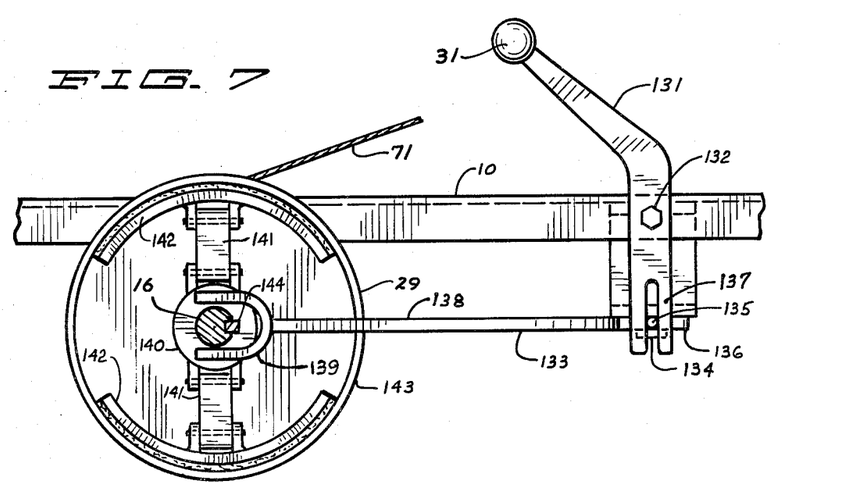
FIG. 7 is an enlarged vertical sectional view taken on the line 7—7 in FIG. 5.
Figure 8:
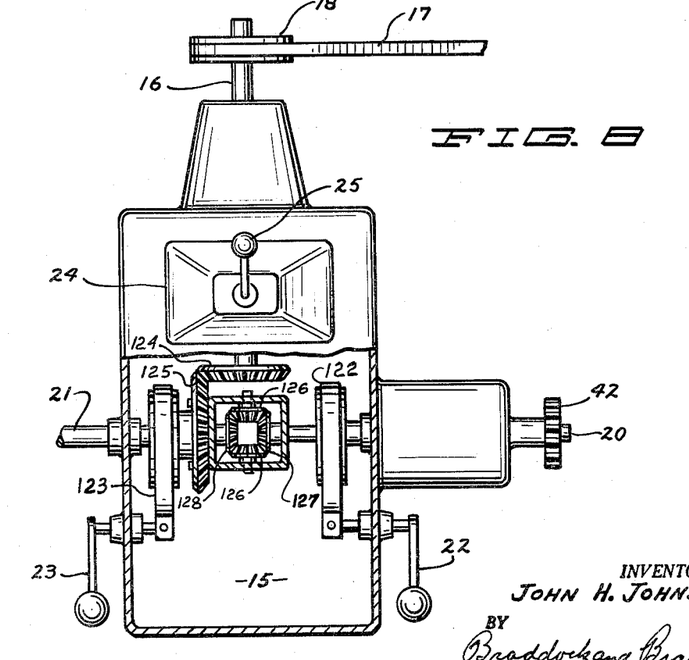
FIG. 8 is an enlarged fragmentary view with parts broken away of the differential mechanism as seen in FIG. 3.

The devices 31 and 32 include clutch arms 131 each pivotally mounted as at 132 to the frame of the machine and a bell crank 133 pivoted as at 134 to the frame to have a pin 135 in a first arm 136 thereof operably associated with a slotted lower end portion 137 of clutch arm 131. A second arm 138 of said bell crank 133 includes a bifurcated yoke 139 situated to control axial movement of a clutch hub 140 slidably mounted on said cross shaft 26. This hub 140 pivotally supports a pair of links 141, 141 which are also pivotally supported with respect to brake shoes 142, 142. As will be apparent, movement of the clutch arm 131 in clock-wise direction as seen in FIG. 7 will cause the yoke 139 to force the hub 140 in direction to cause the links 141, 141 to move the brake shoes 142, 142 outwardly toward and into locking engagement with brake drum 143 thus to lock the brake drum and the corresponding hoisting drum to the cross shaft 26 through the instrumentality of said shoes, links, yoke and a key 144 between said cross shaft 26 and said yoke 140.

An end of the cross shaft 26 fixedly supports a vertical, longitudinally disposed pulley 33 on which rides a V-belt 34, parallel to the V-belt 17, and the V-belt 34 also rides a vertical, longitudinally disposed pulley 35 fixed on a horizontal, transversely extending stub shaft 36. The stub shaft 36 is suitably and conveniently mounted on the frame 10 and also in a housing 37 substantially at the midwidth of said frame. A bevel gear 38 on said stub shaft and in said housing meshes with a bevel gear 39 in the housing and fixed on a horizontal, longitudinal shaft 40. The shaft 40 is mounted in and extends forwardly from the housing 37 and is also rotatably mounted, as at 41, on the frame. As will be clear from FIG. 1 of the drawings, the first axle 20 fixedly supports a vertical, transverse sprocket 42. A vertical chain 43, extending upwardly from the sprocket 42, rides said sprocket and also rides a vertical, transverse sprocket 44 fixed on a forward end portion of the horizontal, longitudinal shaft 40. It will be evident that the cross shaft 26 will be rotated in response to rotation of the first axle 20, through the instrumentality of the sprocket 42, the chain 43, the sprocket 44, the shaft 40, the bevel gears 39 and 38, the stub shaft 36, the pulley 35, the V-belt 34 and the pulley 33.

A rearward portion of the frame 10 fixedly supports a horizontal annular member 45, in longitudinally alined relation to and at the rear of the second axle 21, and said annular member rotatably supports a horizontal annular drive wheel or bull gear 46 securely held in place on the annular member and guided in its rotary movement in any ordinary or preferred manner. A lower surface of the annular drive wheel or bull gear 46 is provided with spaced, downwardly facing gear teeth 47, and the rearward end of the second axle 21 fixedly supports a bevel pinion 48 which is in mesh with the gear teeth 47. Obviously, the annular drive wheel or bull gear 46 will be rotated in response to rotation of the second axle 21, through the instrumentality of the bevel pinion 48 and the gear teeth 47. Said second axle is suitably and conveniently rotatably mounted on the frame, as at 49.

Transversely spaced, vertical uprights, each denoted 50, are rigid with the frame and extend upwardly from opposite sides of the rearward end portion thereof. A horizontal, transverse shaft 51 extends between and is fixedly secured, as at 52, to upper end portions of said vertical uprights.

Transversely spaced, upright derrick arms, each represented 53, are pivotally supported, as at 54, upon the horizontal, transverse shaft 51 for swinging movement in a vertical plane forwardly and rearwardly of the frame 10. More explicitly stated, there is an upright derrick arm 53 in adjacent relation to and at the interior side of each vertical upright 50. Each derrick arm is constituted as a straight elongated member of rigid material an upper length 55 of which is above and a lower length 56 of which is below the transverse shaft 51. A horizontal, transverse shaft 57 extends between and is secured to upper ends of the upper lengths of the derrick arms 53, and said transverse shaft 57 rotatably supports a vertical, longitudinally disposed sheave 58. Mechanism, represented generally at 59, is for adjustably securing lower end portions of the lower lengths 56 of the derrick arms 53 to the frame, thus to situate the sheave 58 in vertical alinement with the center of the annular drive wheel or bull gear 46. The construction of the adjusting mechanism 59 and the manner in which it is to be manipulated will hereinafter be set forth.

Figure 1:
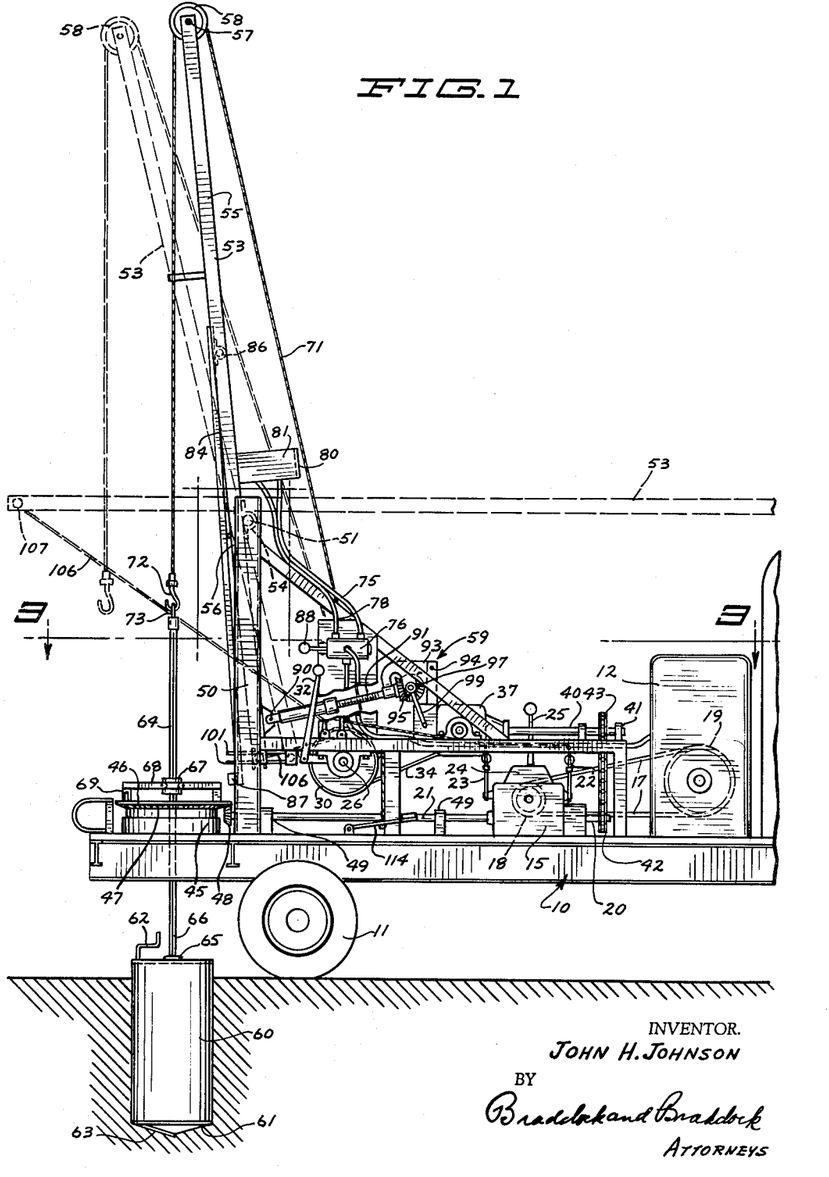
FIG. 1 is a side elevational view of an apparatus made according to the invention as when in use.
Figure 2:
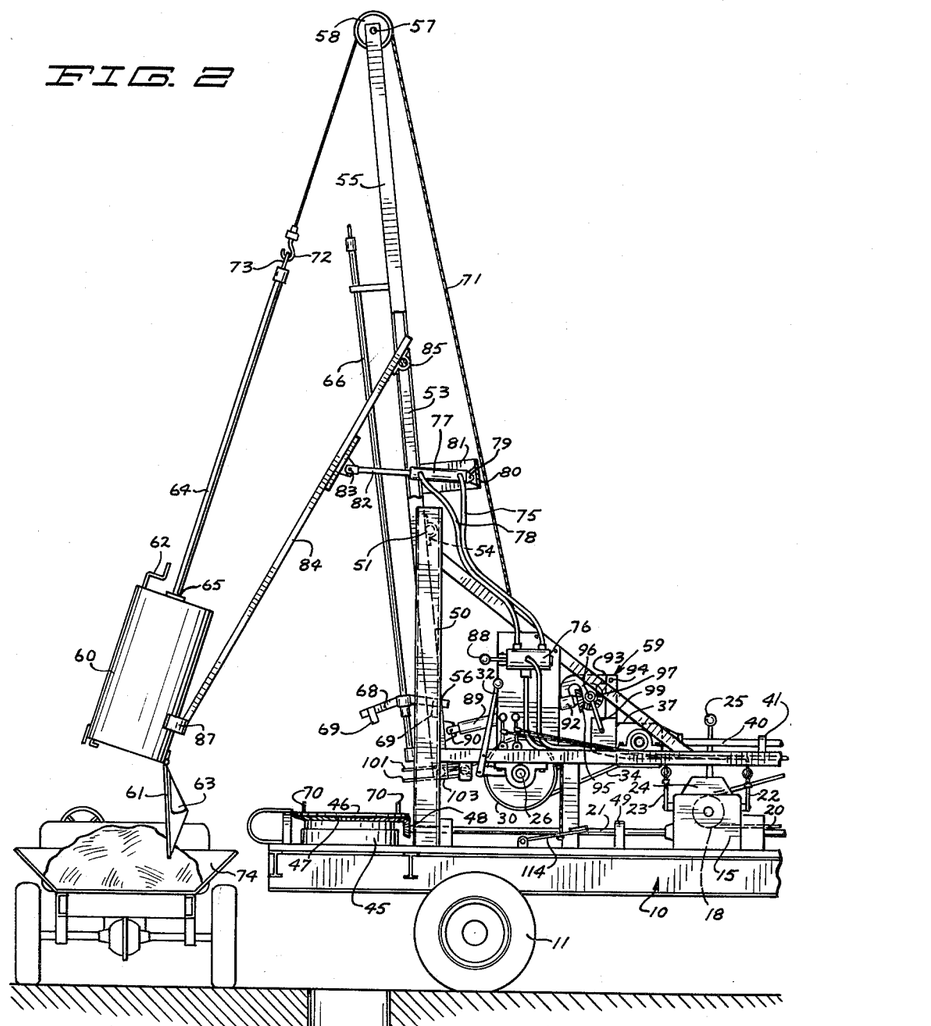
FIG. 2 is a similar view, parts being omitted, disclosing elements of the apparatus in different positions.
Figure 3:
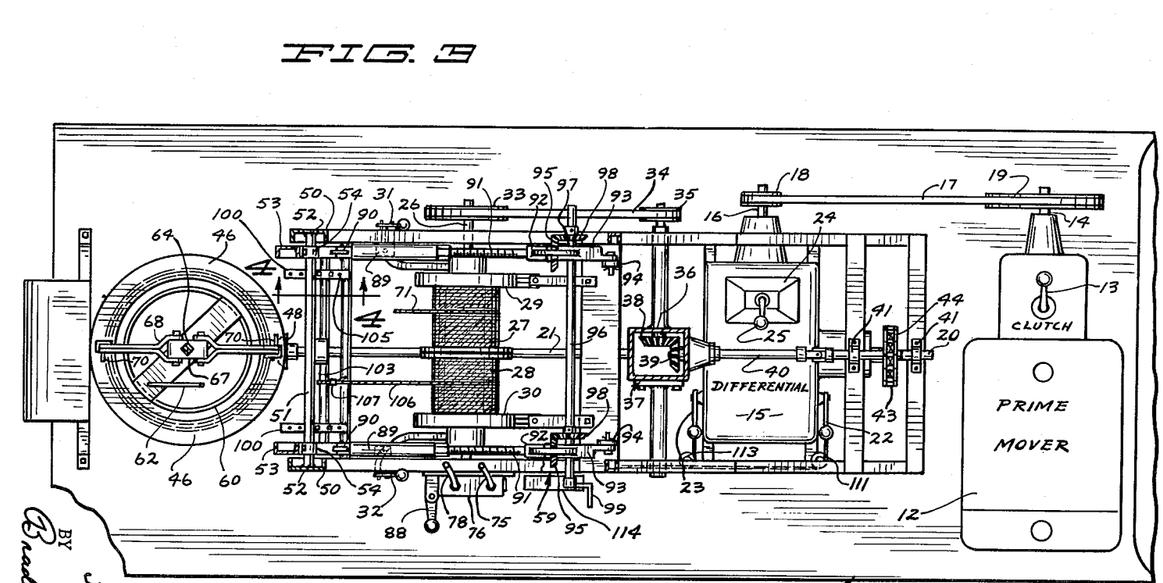
FIG. 3 is an enlarged horizontal sectional view taken on line 3—3 in FIG. 1.
Figure 4:
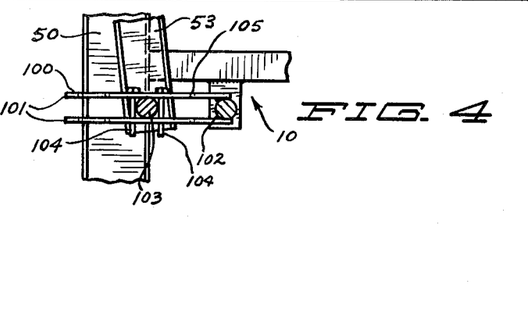
FIG. 4 is a detail sectional view, taken on line 4—4 in FIG. 3.
Figure 5:
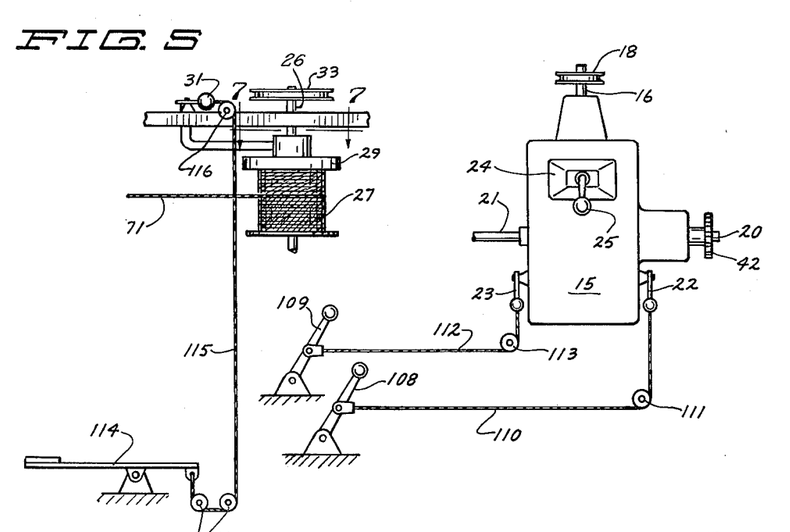
FIG. 5 is a diagrammatic view disclosing features and characteristics of the apparatus.

A cylindrical bucket 60, of ordinary or preferred construction, has a pivotally attached head or bottom 61 which can be swung up and held closed, as in FIG. 1, or released, as by a crank arm 62, to open by gravity, as in FIG. 2. The head or bottom 61 supports scoops or cutting bits 63 which sever slices of material from the earth and force them up into the cylindrical bucket, to be released from said bucket, as in said FIG. 2, when it is removed from a hole. Buckets of the character as described are old in the art.

A non-circular first driving rod 64, square in cross-section as disclosed, is secured centrally, as at 65, to the upper end of the cylindrical bucket and extends upwardly therefrom in longitudinal alinement therewith. A non-circular second driving rod 66 is to be detachably secured to the upper end of the first driving rod 64 in alinement therewith. In FIG. 2 the second driving rod 66 is detachably supported upon the derrick arms 53.

A driving yoke 68, having a non-circular opening therethrough, square in cross-section as shown, is closely fitted to and slidable longitudinally along the first and second driving rods 64 and 66. The driving yoke 68 is to be rested upon the annular drive wheel or bull gear 46 with diametrically spaced, downwardly extending lugs, each denoted 69, on said driving yoke situated forwardly of advancing surfaces of diametrically spaced, upwardly extending ears, each denoted 70, on said annular drive wheel or bull gear. Clearly, the ears 70 will cause the driving yoke 68 with lugs 69 thereon, and hence the first and second driving rods 64 and 66 together with the cylindrical bucket 60, to be rotated in response to rotation of the annular drive wheel or bull gear 46.

A first hoisting cable 71 on the first hoisting drum 27 is for elevating and lowering the cylindrical bucket 60, the first driving rod 64 and the second driving rod 66 when fixed to the upper end of said first driving rod. The first hoisting cable passes upwardly and rearwardly over the sheave 58 and then downwardly. A hook 72 on the lower end of said first hoisting cable is for detachable assembly with an eye 73 to be removably secured to the upper end of the first driving rod 64, or to the upper end of the second driving rod, or to a similar third driving rod when and if secured to said second driving rod. The cylindrical bucket 60 will be lowered by gravity, centrally through the annular drive wheel or bull gear 46 and the annular member 45, when to be placed in operation, merely by permitting the first hoisting cable 71 to be played out. And said first hoisting cable will be wound upon the first hoisting drum 27 when said cylindrical bucket is to be elevated. The hook 72 will be detached from the boring device when it is to become operative to produce a well or other hole.

A construction and arrangement is included for swinging the cylindrical bucket 60 rearwardly to be dumped clear of the frame 10, as into a vehicle 74, after said cylindrical bucket has been elevated to position above the annular drive wheel or bull gear 46 and while a driving rod rigid with the cylindrical bucket is assembled with the hook 72 on the first hoisting cable, as in FIG. 2 of the drawings.

A first hose 75 leads from a source 76 of fluid under pressure to a cylinder 77, and a second hose 78 leads from said cylinder back to said source. The source 76 is suitably and conveniently supported on the frame 10. An end of the cylinder 77 is pivotally supported, as at 79, for swinging movement in a vertical plane, upon an end wall 80 of a bracket including laterally spaced side walls 81 secured to the upper lengths 55 of the derrick arms 53 at the forward side thereof, or side opposite the cylindrical bucket 60. The cylinder 77 is between the side walls 81 of the bracket and extends rearwardly. A piston 82 in said cylinder has a rearward or outer end thereof pivotally secured, as at 83, to an intermediate portion of a forward surface of an actuator arm 84 an upper end portion of which is pivotally secured, as at 85, for swinging movement in a vertical plane longitudinally of the frame, upon a cross shaft 86 extending between and secured to intermediate portions of said upper lengths of the derrick arms 53. A part-cylindrical element 87, integral with and extending exteriorly of opposite side edges of the lower end of the actuator arm 84 and curved rearwardly of the frame, is for engagement with the side surface of the cylindrical bucket 60, as in FIG. 2 of the drawings. A manually manipulatable lever 88 is for controlling flow of fluid under pressure from the source 76 to the cylinder 77 and back to said source. Fluid under pressure will be applied in said cylinder when the cylindrical bucket is to be dumped, thus to cause the piston 82 to be forcibly moved rearwardly and the actuator arm 84 with part-cylindrical element 87 to be swung rearwardly, and pressure will be released from the cylinder after dumping is accomplished, thus to permit said cylindrical bucket to return by gravity to its natural position. The part-cylindrical element 87 will be slid longitudinally upwardly along the cylindrical bucket while it is being swung rearwardly and downwardly while it is returning to vertical position.

The adjusting mechanism 59, for situating the sheave 58 in vertical alinement with the center of the annular drive wheel or bull gear 46, includes a pair of transversely spaced, internally threaded, duplicate elongated tubular elements, each denoted 89. The tubular elements 89 extend longitudinally of the frame and the rear end of each is pivotally, releasably secured, as at 90, to a lower end portion of the lower length 56 of the derrick arm 53 at the corresponding side of said frame. A worm shaft 91 is assembled with and extends longitudinally forwardly from each tubular element. The worm shafts also are of duplicate construction. A forward end portion of each worm shaft is rotatably mounted, as at 92, in a fixture 93 pivotally secured, as at 94, to the frame, and bevel gears 95 on the forward ends of the worm shafts, respectively, face forwardly. The tubular elements 89, the worm shafts 91 and the bevel gears 95 are in a single plane and said bevel gears are in transverse alinement. A cross shaft 96, rotatably mounted in the fixtures 93 rigidly supports longitudinally spaced bevel gears 98 which mesh with the bevel gears 95, respectively, and a crank 99 on the cross shaft is for manually accomplishing its rotation. The overall length of the elongated tubular elements 89 and the worm shafts 91 will be increased in response to rotation of the cross shaft 96 in one direction and decreased in response to rotation of said cross shaft in opposite direction. With increase of the overall length of said tubular elements and worm shafts the upper lengths 55 of the derrick arms 53 will be adjustably swung forwardly and with decrease of the overall length of the tubular elements and worm shafts said upper lengths 55 will be adjustably swung rearwardly. Wells and other holes are to be bored in earth the surface of which frequently is of irregular configuration. That is, transporting vehicles for well digging equipment often are required to stand on unlevel surfaces while digging is accomplished which situate the derrick arms and sheaves, such as 53 and 58, in undesirable positions. The mechanism 59 is for situating the sheave 58 in vertical alinement with a well or hole to be dug regardless of whether the transporting vehicle is rested upon level or unlevel earth surface.

Means for securing the derrick arms 53 in fixed relation to the frame 10, after said derrick arms have been adjusted by employment of the mechanism 59, includes transversely spaced sets 100 of longitudinally extending, vertically spaced, rigid straps 101. Forward ends of the vertically spaced straps of each set are fixedly secured, as at 102, to said frame and extend horizontally rearwardly therefrom in parallel relation. A cross rod 103, connected between the lower ends of the lower lengths 56 of the derrick arms 53, is for entry between the vertically spaced straps of the different sets, and stop pins 104 are for removable entry into and through longitudinally spaced apertures 105 in said vertically spaced straps. During swinging adjustment of the derrick arms the cross rod 103 will be slid longitudinally along the spaced straps, forwardly or rearwardly as the case may be, and upon completion of swinging adjustment stop pins 104 will be inserted into and through apertures 105 directly in front of and at the rear of said cross rod. That is, forward stop pins will be in proximate relation to a forward surface and rearward stop pins will be in proximate relation to a rearward surface of the crossrod, thus to fix the derrick arms against swinging movement either forwardly or rearwardly. The mechanism 59 will not perform any service, and there will be no stress on said mechanism, when the derrick arms shall have been fixed against swinging movement in the manner as set forth.

The brake 122 will be applied when the annular drive wheel or bull gear 46 is to be operative, and the brake 123 will be applied when the first hoisting drum 27 is to be rotated to elevate the cylindrical bucket with appurtenances. Said first hoisting drum will be clutched to the cross shaft 26 when said cylindrical bucket is to be lifted and released from said cross shaft when the cylindrical bucket is to be lowered. The brake 29 will be applied when said cylindrical bucket is to be held in suspended position.

A hand lever 108 is for operating the brake 122 and a hand lever 109 is for operating the brake 123. Said hand levers are mounted on the frame 10 at a location at a rearward portion thereof. An actuating cable 110 extends from the hand lever 108 over a roller 111 to the brake lever 22 and an actuating cable 112 extends from the hand lever 109 over a roller 113 to the brake lever 23. The lower ends of the hand levers 108 and 109 are pivoted on the frame and the upper ends are to be moved in direction away from the brakes to cause them to be applied.

A foot pedal 114 is for operating the device 31 for clutching the first hoisting drum 27 to the cross shaft 26.

The foot pedal is mounted on the frame at a location adjacent to the hand levers 108 and 109. An actuating cable 115 extends from said foot pedal over rollers 116 to said device. An intermediate portion of the foot pedal is pivoted on the frame and an end portion of said foot pedal is to be depressed to cause the device to be operated to clutch said first hoisting drum to said cross shaft.

The hand levers 108, 109 and the foot pedal 114 can be manipulated concurrently to simultaneously apply rotating and lifting forces to the cylindrical bucket 60 to the end that obstructions such as large stones when encountered during digging can be, in effect, pivoted out of position and thus released to be readily and easily removable from a well or other hole. The brakes 122 and 123 can be simultaneously partially applied to cause the cross shaft 26 to be rotated while the cylindrical bucket is being rotated, and the device 31 can at the same time be manipulated to clutch the first hoisting drum 27 to said cross shaft thus to cause said cylindrical bucket to be lifted in response to rotation of said first hoisting drum. And, too, the shift lever 25 can be situated in an advance or reverse position drive during operations of releasing obstructions to cause the cylindrical bucket selectively to be rotated either forwardly or rearwardly. Or said shift lever can be situated to disconnect the differential from the prime mover. Stated differently, obstructions such as large stones when encountered can be loosened and released, to be removable from wells or other holes by means not disclosed, by concurrent employment of the hand levers 108, 109, the foot pedal 114 and the shift lever 25 to simultaneously rotate and elevate the cylindrical bucket and cause the scoops or cutting bits 63 on said cylindrical bucket to be rotated.

Figure 6:
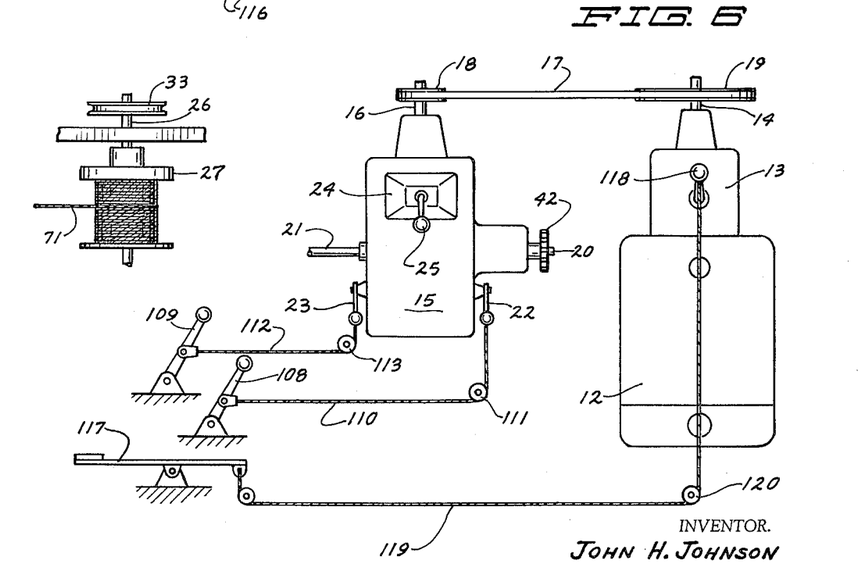
FIG. 6 is a diagrammatic view of an apparatus of modified construction made according to the invention.

The apparatus disclosed in FIG. 6 is in most respects the same as the apparatus hereinbefore described and elements therein which are the same as, or equivalent to, elements shown in FIGS. 1 to 5 bear the same reference numerals.

A foot pedal 117 is for operating a clutch lever 118 of the clutch mechanism 13 to connect the prime mover 12 to and disconnect it from the driven shaft 14. The foot pedal 117 is mounted on the frame adjacent to the hand levers 108, 109. An actuating cable 119 extends from said foot pedal 117 over rollers 120 to the clutch lever 118. An intermediate portion of the foot pedal 117 is pivoted on the frame and an end portion of said foot pedal is to be depressed to cause said clutch mechanism to operatively progressively connect the prime mover to and release it from said driven shaft.

In the form of the invention disclosed in FIG. 6, the device 31 will be retained in position where it clutches the first hoisting drum 27 to the cross shaft 26 while an obstruction is being pivoted out of position thus to be released, and the foot pedal 117 will be employed to progressively connect and disconnect the prime mover 12 and the driven shaft 14. That is the hand levers 108, 109 and the foot pedal 117 will be manipulated concurrently in the accomplishment of releasing obstructions. The gear shift lever 25 will be employed to change the speed and reverse the operation of the first and second axles 20 and 21 with respect to the input shaft 16, and the foot lever 117 will be employed to progressively connect and disconnect the prime mover and the differential.

During travel of a vehicle on which the apparatus is supported the derrick arms 53 are to be swung forwardly and downwardly, as disclosed in dotted lines in FIG. 1, to be rested on a forward portion (not shown) of the supporting vehicle. The elongated tubular elements 89 will be released, at 90, from the derrick arms and the stop pins 104 will be withdrawn when said derrick arms are to be swung, on the shaft 51 as an axis, from upstanding position to forward horizontal position.

An end of a second hoisting cable 106, on the second hoisting drum 28, is secured, at 107, to the cross rod 103 between the lower ends of the derrick arms 53. The second hoisting cable 106 will be wound upon the hoisting drum to cause the derrick arms to be swung upwardly and rearwardly from horizontal to upstanding position and permitted to be played out when said derrick arms are to be lowered by gravity from upstanding to forward horizontal position.

What is claimed is:

1. In a well boring apparatus, a frame, a differential on said frame including first and second axles, an input shaft for forcibly rotating the first and second axles of said differential, a first brake manually operable to retain the first axle stationary thus to cause the second axle alone to be rotated in response to rotation of said input shaft, a second brake manually operable to retain the second axle stationary thus to cause the first axle alone to be rotated in response to rotation of the input shaft, a derrick on said frame, a sheave on said derrick, a boring tool with a driving rod, first means for raising and lowering said boring tool with the driving rod constituted as a drum shaft rotatably supported on the frame, a drum rotatable on the drum shaft, a device for clutching said drum to and releasing it from said drum shaft, a cable on the drum and extending over said sheave and means for securing an end of the cable spaced from said drum to said driving rod, second means for rotating the boring tool constituted as a drive wheel rotatably mounted on said frame and a driving yoke to be engaged by said drive wheel longitudinally slidable along and fixed against turning movement relative to said driving rod, a first operative connected between said first axle and said drum shaft, and a second operative connection between said second axle and said drive wheel.

2. In a well boring apparatus, a frame, a differential on said frame including first and second axles, an input shaft for forcibly rotating the first and second axles of said differential, a first brake manually operable to retain the first axle stationary thus to cause the second axle alone to be rotated in response to rotation of said input shaft, a second brake manually operable to retain the second axle stationary thus to cause the first axle alone to be rotated in response to rotation of the input shaft, a derrick on said frame, a sheave on said derrick, a boring tool with a driving rod, first means for raising and lowering said boring tool with the driving rod constituted as a drum shaft rotatably supported on the frame, a drum rotatable on the drum shaft, a device for clutching said drum to and releasing it from said drum shaft, a cable on the drum and extending over said sheave and means for securing an end of the cable spaced from said drum to said driving rod, second means for rotating the boring tool constituted as a drive wheel for receiving said boring tool, means rotatably supporting said drive wheel on said frame and a driving yoke longitudinally slidable along and fixed against turning movement relative to said driving rod including elements to be engaged by said drive wheel, a first operative connection between said first axle and said drum shaft, and a second operative connection between said second axle and said drive wheel.

3. In a well boring apparatus, a frame, a differential on said frame including first and second axles, an input shaft for forcibly rotating the first and second axles of said differential, a first brake manually operable to decelerate the speed of rotation of the first axle thus to cause the speed of rotation of the second axle to be accelerated in response to rotation of said input shaft, a second brake manually operable to decelerate the speed of rotation of the second axle thus to cause the speed of rotation of the second axle to be accelerated in response to rotation of the input shaft, a derrick on said frame constituted as an upright and an upstanding arm having a midportion thereof pivotally supported upon an upper portion of said upright for swinging movement in a vertical plane forwardly and rearwardly of said frame, a sheave on a portion of said upstanding arm above its pivotal support, a boring tool with a driving rod, first means for raising and lowering said boring tool with the driving rod constituted as a drum shaft, a drum rotatably mounted on said drum shaft, a device for clutching the drum to and releasing it from said drum shaft, a first cable on said drum and extending over said sheave and means for securing an end of the first cable spaced from the drum to said driving rod, second means for rotating the boring tool constituted as a drive wheel rotatably mounted on said frame and a driving yoke longitudinally slidable along and fixed against turning movement relative to said driving rod to be engaged by said drive wheel, a first operative connection between said first axle and said drum shaft, a second operative connection between said second axle and said drive shaft, and means including a second cable secured to a portion of said upright arm below its pivotal support operable in response to actuation of said first axle to swing the portion of said upright arm above its pivotal support from a substantially horizontal position to a substantially upright position.

4. In a well boring apparatus, a frame, a differential on said frame including first and second axles, an input shaft for forcibly rotating the first and second axles of said differential, a first brake manually operable to decelerate the speed of rotation of the first axle thus to cause the speed of rotation of the second axle to be accelerated in response to rotation of said input shaft, a second brake manually operable to decelerate the speed of rotation of the second axle thus to cause the speed of rotation of the first axle to be accelerated in response to rotation of the input shaft, a derrick on said frame constituted as an upright and an upstanding arm having a midportion thereof pivotally supported upon an upper portion of said upright for swinging movement in a vertical plane forwardly and rearwardly of said frame, a sheave on a portion of said upstanding arm above its pivotal support, a boring tool with a driving rod, first means for raising and lowering said boring tool with the driving rod constituted as a drum shaft, a first drum rotatably mounted on said drive shaft, a first device for clutching the first drum to and releasing it from said drum shaft, a first cable on said first drum and extending over said sheave and means for securing an end of the first cable spaced from the first drum to said driving rod, second means for rotating the boring tool constituted as a drive wheel rotatably mounted on said frame and a driving yoke longitudinally slidable along and fixed against turning movement relative to said driving rod to be engaged by said drive wheel, a first operative connection between said first axle and said drum shaft, a second operative connection between said second axle and said drive wheel, a second drum rotatably mounted on the drum shaft, a second device for clutching the second drum to and releasing it from said drum shaft, a second cable on said second drum, and means for securing an end of the second cable spaced from the second drum to a portion of the upright arm below its pivotal support.

5. In a well boring apparatus, a frame, a differential on said frame including first and second axles, an input shaft for forcibly rotating the first and second axles of said differential, a first brake manually operable to retain the first axle stationary thus to cause the second axle alone to be rotated in response to rotation of said input shaft, a second brake manually operable to retain the second axle stationary thus to cause the first axle alone to be rotated in response to rotation of the input shaft, a derrick on said frame, a sheave on said derrick, a boring tool with a driving rod, first means for raising and lowering said boring tool with the driving rod constituted as a drum shaft rotatably supported on the frame, a drum rotatable on the drum shaft, a device for clutching said drum to and releasing it from said drum shaft, a cable on the drum and extending over said sheave and means for securing an end of the cable spaced from said drum to said driving rod, second means for rotating the boring tool constituted as a drive wheel for receiving said boring tool, means rotatably supporting said drive wheel on said frame and a driving yoke longitudinally slidable along and fixed against turning movement relative to said driving rod including elements to be engaged by said drive wheel, a first operative connection between said first axle and said drum shaft, a second operative connection between said second axle and said drive wheel, and a mechanism on said frame for rotatably adjusting said upstanding arm in direction forwardly and rearwardly of said frame.

6. In a well boring apparatus, a frame, a differential on said frame including first and second axles, an input shaft for forcibly rotating the first and second axles of said differential, a first brake manually operable to retain the first axle stationary thus to cause the second axle alone to be rotated in response to rotation of said input shaft, a second brake manually operable to retain the second axle stationary thus to cause the first axle alone to be rotated in response to rotation of the input shaft, a derrick on said frame, a sheave on said derrick, a boring tool with a driving rod, first means for raising and lowering said boring tool with the driving rod constituted as a drum shaft rotatably supported on the frame, a drum rotatable on the drum shaft, a device for clutching said drum to and releasing it from said drum shaft, a cable on the drum and extending over said sheave and means for securing an end of the cable spaced from said drum to said driving rod, second means for rotating the boring tool constituted as a drive wheel for receiving said boring tool, means rotatably supporting said drive wheel on said frame and a driving yoke longitudinally slidable along and fixed against turning movement relative to said driving rod including elements to be engaged by said drive wheel, a first operative connection between said first axle and said drum shaft, a second operative connection between said second axle and said drive wheel, and mechanism on said derrick for swinging said boring tool with the driving rod toward and away from said frame.

7. In a well boring apparatus, a frame, a differential on said frame including first and second axles, an input shaft for forcibly rotating the first and second axles of said differential, a first brake manually operable to retain the first axle stationary thus to cause the second axle alone to be rotated in response to rotation of said input shaft, a second brake manually operable to retain the second axle stationary thus to cause the first axle alone to be rotated in response to rotation of the input shaft, a derrick on said frame, a sheave on said derrick, a boring tool with a driving rod, first means for raising and lowering said boring tool with the driving rod constituted as a drum shaft rotatably supported on the frame, a drum rotatable on the drum shaft, a device for clutching said drum to and releasing it from said drum shaft, a cable on the drum and extending over said sheave and means for securing an end of the cable spaced from said drum to said driving rod, second means for rotaating the boring tool constituted as a drive wheel for receiving said boring tool, means rotatably supporting said drive wheel on said frame and a driving yoke longitudinally slidable along and fixed against turning movement relative to said driving rod including elements to be engaged by said drive wheel, a first operative connection between said first axle and said drum shaft, a second operative connection between said second axle and said drive wheel, mechanism for rotatably adjusting said upstanding arm in direction forwardly and rearwardly of said frame, and mechanism on said derrick for swinging said boring tool with the driving rod toward and away from said frame.

8. In a well boring apparatus, a frame, a differential on said frame including first and second axles an input shaft for forcibly rotating the first and second axles of said differential, a first brake manually operable to decelerate the speed of rotation of the first axle thus to cause the speed of rotation of the second axle to be accelerated in response to rotation of said input shaft, a second brake manually operable to decelerate the speed of rotation of the second axle thus to cause the speed of rotation of the first axle to be accelerated in response to rotation of the input shaft, a derrick on said frame constituted as an upright and an upstanding arm having a midportion thereof pivotally supported upon an upper portion of said upright for swinging movement in a vertical plane forwardly and rearwardly of said frame, a sheave on a portion of said upstanding arm above its pivotal support, a boring tool with a driving rod, first means for raising and lowering said boring tool with the driving rod constituted as a drum shaft, a drum rotatably mounted on said drum shaft, a device for clutching the drum to and releasing it from said drum shaft, a first cable on said drum and extending over said sheave and means for securing an end of the first cable spaced from the drum to said driving rod, second means for rotating the boring tool constituted as a drive wheel rotatably mounted on said frame and a driving yoke longitudinally slidable along and fixed aganst turning movement relative to said driving rod to be engaged by said drive wheel, a first operative connection between said first axle and said drum shaft, a second operative connection between said second axle and said drive shaft, means including a second cable secured to a portion of said upright arm below its pivotal support operable in response to actuation of said first axle to swing the portion of said upright arm above its pivotal support from a substantially horizontal to a substantially upright position, and mechanism on said frame for rotatably adjusting said upstanding arm in direction forwardly and rearwardly of said frame.

9. In a well boring apparatus, a frame, a differential on said frame including first and second axles, an input shaft for forcibly rotating the first and second axles of said differential, a first brake manually operable to decelerate the speed of rotation of the first axle thus to cause the speed of rotation of the second axle to be accelerated in response to rotation of said input shaft, a second brake manually operable to decelerate the speed of rotation of the second axle thus to cause the speed of rotation of the first axle to be accelerated in response to rotation of the input shaft, a derrick on said frame constituted as an upright and an upstanding arm having a midportion thereof pivotally supported upon an upper portion of said upright for swinging movement in a vertical plane forwardly and rearwardly of said frame, a sheave on a portion of said upstanding arm above its pivotal support, a boring tool with a driving rod, first means for raising and lowering said boring tool with the driving rod constituted as a drum shaft, a drum rotatably mounted on said drum shaft, a device for clutching the drum to and releasing it from said drum shaft, a first cable on said drum and extending over said sheave and means for securing an end of the first cable spaced from the drum to said driving rod, second means for rotating the boring tool constituted as a drive wheel rotatably mounted on said frame and a driving yoke longitudinally slidable along and fixed against turning movement relative to said driving rod to be engaged by said drive wheel, a first operative connection between said first axle and said drum shaft, a second operative connection between said second axle and said drive shaft, means including a second cable secured to a portion of said upright arm below its pivotal support operable in response to actuation of said first axle to swing the portion of said upright arm above its pivotal support from a substantially horizontal to a substantially upright position, mechanism on said frame for rotatably adjusting said upstanding arm in direction forwardly and rearwardly of said frame, and mechanism on said derrick for swinging said boring tool with the driving rod toward and away from said frame.

References Cited in the file of this patent

UNITED STATES PATENTS

| | | |
|---|---|---|
| 94,923 | Summers | Sept. 14, 1869 |
| 1,703,234 | Halliburton | Feb. 26, 1929 |
| 1,962,346 | Hild | June 12, 1934 |
| 2,165,350 | Davidson et al. | July 11, 1939 |
| 2,171,994 | Riise | Sept. 5, 1939 |
| 2,176,731 | Claire | Oct. 17, 1939 |
| 2,271,577 | Woolslayer | Feb. 3, 1942 |
| 2,275,813 | Abegg | Mar. 10, 1942 |
| 2,343,517 | Alexander et al. | Mar. 7, 1944 |
| 2,379,333 | Athy | June 26, 1945 |
| 2,650,796 | Abraham | Sept. 1, 1953 |
| 2,822,147 | Allard | Feb. 4, 1958 |